(12) United States Patent
Davies

(10) Patent No.: US 6,501,237 B2
(45) Date of Patent: Dec. 31, 2002

(54) DIMMER UNIT

(76) Inventor: Kevin J. Davies, c/o KJD Electronics, Firtree Road, Hastings, East Essex, TN34 3TR (GB)

( * ) Notice: Subject to any disclaimer, the term of this patent is extended or adjusted under 35 U.S.C. 154(b) by 0 days.

(21) Appl. No.: 09/835,222

(22) Filed: Apr. 13, 2001

(65) Prior Publication Data

US 2002/0149328 A1 Oct. 17, 2002

(51) Int. Cl.$^7$ .......................... H05B 37/02; H05B 41/16
(52) U.S. Cl. ......................................... 315/362; 315/247
(58) Field of Search ................................ 315/247, 291, 315/307, 313, 314, DIG. 4, 362

(56) References Cited

U.S. PATENT DOCUMENTS

| 4,575,659 | A |   | 3/1986  | Pezzolo ............... 315/159 |
| 4,839,562 | A | * | 6/1989  | Francis et al. ........... 315/149 |
| 5,561,351 | A | * | 10/1996 | Vrionis et al. ........... 315/248 |
| 5,621,283 | A |   | 4/1997  | Watson ................. 315/362 |
| 6,188,181 | B1 | * | 2/2001  | Sinha et al. ............ 315/293 |
| 6,188,182 | B1 | * | 2/2001  | Nickols et al. .......... 315/294 |
| 6,300,727 | B1 | * | 10/2001 | Bryde et al. ............ 315/294 |
| 6,377,858 | B1 | * | 4/2002  | Koeppe ................. 700/12 |

FOREIGN PATENT DOCUMENTS

| GB | 2 173 961   | 10/1986 |
| GB | 2 291 289   | 1/1996  |
| WO | WO 87/04890 | 8/1987  |
| WO | WO 88/04517 | 6/1988  |
| WO | WO 92/01968 | 2/1992  |

* cited by examiner

Primary Examiner—Don Wong
Assistant Examiner—Minh D A
(74) Attorney, Agent, or Firm—Lee, Mann, Smith, McWilliams, Sweeney & Ohlson

(57) ABSTRACT

A dimmer unit for controlling the power supplied to a lamp is adapted for connection to a light socket and provides a ramped light output during a brightness selection cycle. A value representing a selected brightness is stored at termination of the brightness selection cycle, and the selected brightness is subsequently applied. The dimmer unit may also provide a security function.

11 Claims, 2 Drawing Sheets

DIMMER UNIT

This invention relates to a dimmer unit for controlling the power supplied to a lamp.

Conventional dimmer units are provided as a replacement light switch which controls the power supplied to the light socket associated with the switch, depending upon the dimmer setting. Typically, such a unit uses a triac for the power control.

A problem with this system is that a new light switch must be wired into place, which is inconvenient for tan ed user. Furthermore, the multiple light switches are associated with an individual light socket, for example in hallways and landings, the use of dimmer switches is more complicated.

According to the invention, there is provided a dimmer unit for controlling the power supplied to a lamp, the unit being adapted for connection to a light socket and comprising:

means for providing a varying output signal during a brightness selection cycle which is initiated by supplying power to the dimmer unit; and means for storing a value representing a selected brightness at termination of the brightness selection cycle, the brightness selection cycle being terminated by ceasing the supply of power to the dimmer unit.

The dimmer unit of the invention is associated with a light socket, so that no wiring is required. The dimmer unit may either be provided as a separate component for insertion between the lamp and the light socket, or else it may be provided in the lamp itself.

The varying output signal preferably comprises the brightness of the lamp, and the dimmer unit then comprises means for ramping the power supplied to the lamp during the brightness selection cycle. Other output signals may be contemplated, for example a varying audible signal.

The brightness selection cycle is terminated by switching off the power to the unit. This is thereby achieved using the conventional light switch. When power is net applied to the dimmer unit, it provides power to the lamp corresponding to the selected brightness. Even when applying power corresponding to the selected brightness, the power may again be ramped, so as to limit the thermal shock of the lamp and prolong its lifetime.

The means for storing a value may comprise a non-volatile memory, so that no power is required by the dimmer unit when there is no power supplied to the light socket. Alternatively, normal processor memory may be used, and power may be maintained to the memory by a capacitor arrangement. The construction of the dimmer unit can then be as simple and cost effective as possible, permitting the induction of the unit into the lamp itself.

The ramping of power supplied to the lamp makes this more feasible, as it prolongs the lifetime of the lamp.

The means for ramping power preferably comprises a controller for controlling a triac which governs the power supplied to the lamp. Of course, other electronic switches my also be used.

The dimmer unit may also provide a security mode. For this purpose, the unit may comprise means for determining whether the the during which power is applied to the unit is below a threshold time period, and for switching the unit to a security mode if power is applied for less than the threshold time period after setting a brightness level.

In order to set a brightness level the unit must be turned on and off with a short enough delay that the lamp has not reached fill brightness. Furthermore, to initialise the security mode, the dimmer unit must again be turned on and off with a delay below the threshold time period. Therefore, to activate the security mode the dimmer unit must be turned on and off twice in succession.

For the security mode, the dimmer unit preferably comprises a tight detector for controlling the supply of power to the lamp during the security mode.

The unit may further comprise a sensor enabling the brightness selection cycle to be started and terminated remotely without interrupting the powersupply to the dimmer unit. This may enable an infrared remote control to be implemented or a sound activated system, as additional functionality when the dimmer unit is turned on.

The invention also provides a method of selecting a dimmer unit setting corresponding to a brightness of a lamp associated with the dimmer unit, the dimmer unit being adapted for connection to a light socket, the method comprising:

(i) supplying power to the unit by switching on power to the light socket, the dimmer unit ramping the power supplied to the lamp;

(ii) switching off power to the light socket to select the brightness reached, the dimmer unit storing a value representing the selected brightness; and (iii) switching on power to the light socket, the dimmer unit then applying power to the lamp corresponding to the selected brightness.

An example of the present invention will now be described in detail with reference to the accompanying drawings in which.

Figure 1:
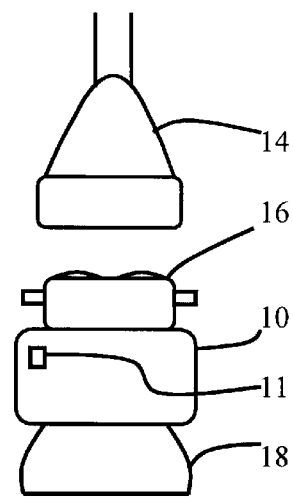
FIG. 1 shows a dimmer unit of the invention for mounting between a lamp and a light socket.
Figure 1:
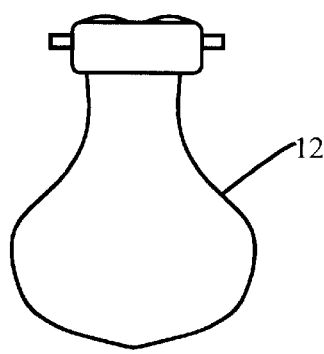

The dimmer unit 10 shown in FIG. 1 effectively comprises a coupling unit which is provided between a lamp 12 and a light socket 14. For this purpose, the dimmer unit 10 comprises a lamp fitting 16, for example a male bayonet fitting, as well as a socket 18 for receiving the lamp 12, for example a female bayonet fitting. The unit receives power from the light socket 14 and in a preferred embodiment is provided. for tamping the power supplied to the lamp 12 during a brightness selection cycle, and for applying a selected brightness to the lamp 12.

Because the dimmer unit is adapted for connection to the light socket 14, no wiring is required in order to install the dimmer unit 10. Furthermore, the dimmer unit 10 is associated with individual light sockets, rather am with light switches, as in the prior art, so that the unit is equally appropriate for light sockets with multiple switches as for light sockets with individual switches.

Figure 2:
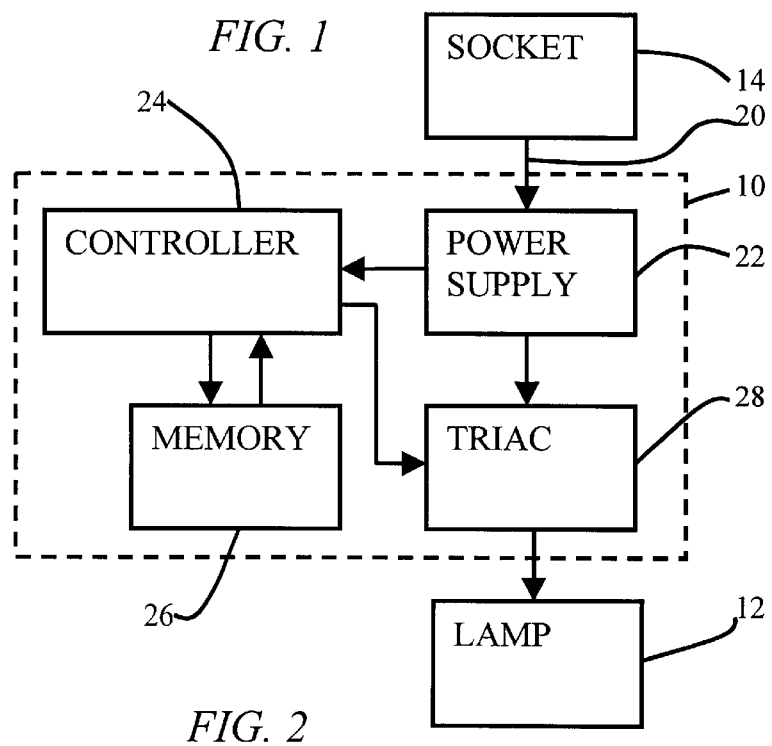
FIG. 2 shows schematically the construction of the dimmer unit of FIG. 1.

FIG. 2 shows in greater detail the construction of the dimmer unit 10. As shown, the dimmer unit 10 receives power from the light socket 14 through the conventional coupling 20, which may be a bayonet fitting, a screw &read fitting or any other conventional electrical to coupling for a lamp, A power supply 22 receives the power from the socket 14 and provides a suitable power output for a microcontroller 24 which includes software implementing the operation of the dimmer unit, to be described below. The controller 24 has access to a non-volatile memory 26 and also provides the control signal for a triac 28 which is provided for controlling the power supplied to the lamp 12. The triac may be replaced by any other suitable electronic switch.

The non-volatile memory 26 enables in dimmer unit 10 to store a-selected brightness value and retain this value in memory even when power to the socket 14 is interrupted. It is of course equally possible to provide a less expensive memory arrangement, and to provide a charge storage device (e.g. a capacitor arrangement) to provide power to the unit when the light socket is turned off. It will be understood from the following description that the memory only needs to retain information for a very limited period of time when the light socket is turned off, during normal operation of the dimmer unit. Thus, a capacitive arrangement for short term power back-up can be appropriate for this purpose.

The operation of the dimmer unit will now be described with reference to FIGS. 3–5.

Figure 3:
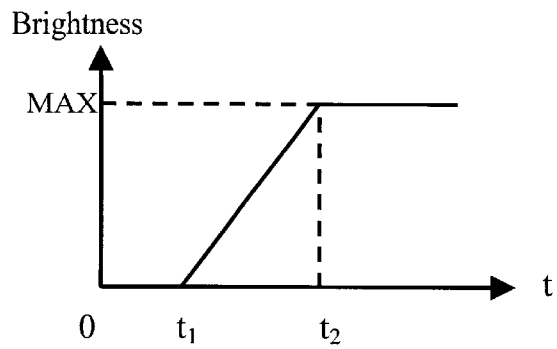
FIG. 3 shows the operation of the dimmer unit controlled in a first manner.

The most basic operation of the dimmer unit is shown in FIG. 3. For the purposes of explanation, we assume that the dimmer unit 10 has been reset, and at time t=0 the power to the light socket is turned off. If power is then turned on at time $t_1$, the controller 24 provides a ramp function for the control of the triac 28 so that the ramped power level is supplied to the lamp 12, giving rise to the increasing brightness level between times $t_1$ and $t_2$ shown in FIG. 3, The ramping may of course be stepped or continuous, During this ramping function, the controller stores in the memory 26 a value representing the brightness level reached at any point in time. In FIG. 3, the power to the socket 14 is left on until the lamp has reached a maximum brightness "MAX". Once this maximum is reached, the brightness remains constant, as shown. Furthermore, the dimmer unit 10 is reset at time $t_2$, with all data stored in the memory 26 being erased. The effect of this is that when the dimmer unit is turned off, no values will be stored in the non-volatile memory 26, and when the inner unit is next turned on it will have been reset, and will once again employ the ramping function shown in FIG. 3.

Figure 4:
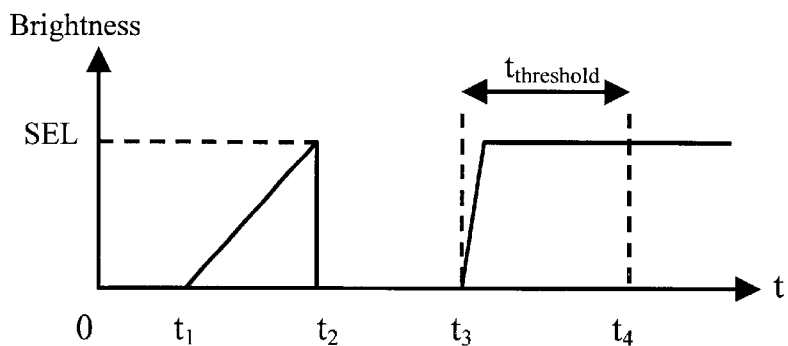
FIG. 4 shows the operation of the dimmer unit controlled in a second manner.
Figure 5:
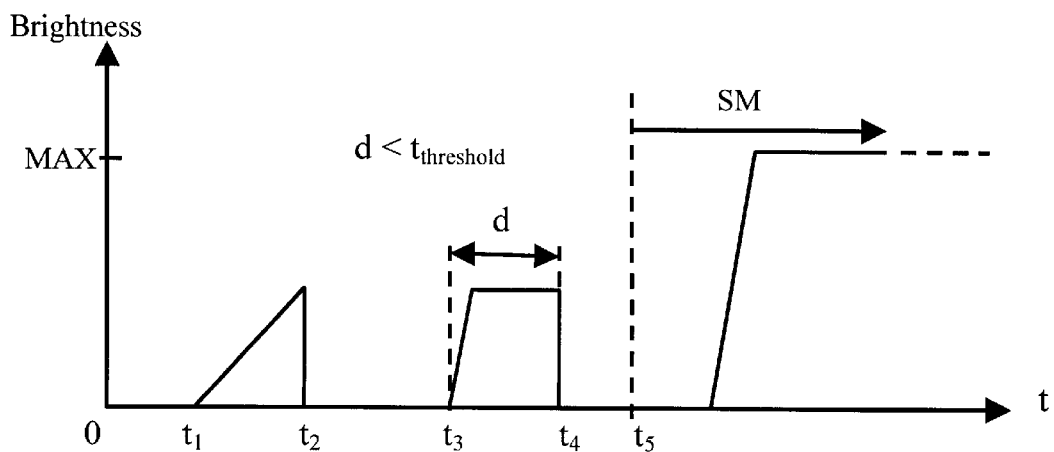
FIG. 5 shows the operation of the dimmer unit controlled in a third manner.

If the user wishes to set a brightness level below the maximum, the operation shown in FIG. 4 is employed. Again, assuming the dimmer unit is reset at the t=0 and that power is supplied to the light socket 14 at time $t_1$, the brightness of the lamp will again commence ramping at time $t_1$. FIG. 4 shows a situation when power to the socket 14 is turned off at time $t_2$, before the ramping function has been completed. Thus, the brightness selection cycle has been terminated by switching off the power to the unit. Prior to termination, the memory 26 has stored a value representing the brightness reached at termination of tie brightness selection cycle. In other words, the most recently recorded value in the non-volatile memory 26 is retained when power is turned off. No separate power supply is required to maintain this value in memory.

When power is next applied to the dimmer unit 10, by switching on the light socket 14, the controller 24 recognises that a value has been stored in the memory 26. This occurs at time $t_3$, and the controller then controls the triac 28 to provide the selected brightness "SEL" determined by the value stored in the memory 26.

If a volatile memory is used, the period of time during which the memory needs to be powered is only the interval $t_2$ to $t_3$, so that only short term power is needed.

As shown in FIG. 4, the brightness may again be ramped to the selected brightness SEL, although a different ramping function may be employed than tat of the brightness selection cycle shown in FIG. 3. This ensures that the power supplied to the lamp 12 is always ramped, and this prolongs the life of the lamp 12 by avoiding sharp thermal shocks to the lamp. Of course, the ramp function at time $t_3$ is optional, and when employed may be much more rapid than for the brightness selection cycle, as shown schematically in FIG. 4.

After time $t_3$ the dimmer unit 10 is operating in a mode for which a brightness level has been selected, hereinafter referred to as a "selected brightness mode". In this mode of operation, once power has been supplied to the dimmer unit 10 for a period of time $t_{threshold}$, then the dimmer unit is again reset, so that when the unit is turned off and on again it stars with the brightness selection cycle of FIG. 3.

The dimmer unit optionally includes a security mode which will be explained with reference to FIG. 5. For this purpose, the controller 24 includes means for determining whether the time during which power is applied to the unit is below the threshold e period the, and for switching the unit to this security mode if power is applied for less than the threshold time period within the selected brightness mode of operation.

FIG. 5 again assumes that the dimmer unit is reset at time t=0, and that the brightness selection cycle is initiated at time $t_1$ and ended at time $t_2$ by switching power to the socket 14 on and off, quickly enough for the brightness selection cycle not to have finished. Thus, at time $t_2$ a value is stored in the memory 26 representing a selected brightness level. At time $t_3$ the dimmer unit is turned on again. To initiate the security mode, the delay d between switching the unit on and off, within the selected brightness mode of operation, must be below the threshold time $t_{threshold}$, to set the security mode. Therefore, during an initial time $t_{threshold}$ of the selected brightness mode a flag in the controller is set to indicate that the security mode is active. Once the threshold time has been passed, the flag is removed and the dinner unit reset. In FIG. 5, the dimmer unit has been turned off at time $t_4$ with the security mode flag active, Therefore, when the dimmer unit is next turned on at time $t_5$, the security mode "SM" is implemented, Various operating characteristics may be defined in the security mode, as will be appreciated by those skilled in the art. For example, the dimmer unit may be provided with a light sensor 11 (shown in FIG. 1), and during the security mode the controller 24 will switch the lamp 12 on and off at random intervals during times of darkness.

To indicate that the security mode has been correctly set, the controller may operate the triac to flag we lamp a number of times. To cancel the security mode, the dimmer unit 10 may require power to be switched off during this flashing stage, to reset the dimmer unit. While in the security mode, the lamp 12 may be caused to flash each time the light switch is turned on.

The dinner unit of the invention my be provided with additional functions for the user. As one example, a remote control may be provided. In this case, with power supplied to the dimmer unit, and the brightness already set (i.e. after time $t_4$ in FIG. 4), the brightness may be changeable using a remote control instead of using the light switch. The remote controller will provide a user control enabling the brightness selection cycle to be restarted and to be terminated to store a new brightness level. As a further alternative, a sound sensor may be provided, so that when the dimmer unit is on, a particular sound may also trigger the brightness selection cycle to start and stop. This sound may be a clap if simple volume detection is provided, or a specific word if a more complex speech recognition algorithm is provided.

The method of operation of the dimmer unit described above enables various functions to be performed, and does not require any back-up power supply for the dimmer unit, The specific circuitry required to implement the invention has not been described in detail, since this will be apparent to those skilled in the art. However, readily available components will be used, and it may be practical to combine the dimmer unit 10 into the connector of the lamp itself.

Various modifications will be apparent to those skilled in the art, for example concerning the activation and deactivation of the security mode. Also, the brightness selection cycle of the preferred embodiment involves providing a ramped light output. Instead, an audible signal of varying tone or pulse repetition rate may be employed, which represents a brightness level. It is to be understood, also, that the security mode is an optional feature.

What is claimed is:

1. A dimmer unit for controlling the power supplied to a lamp, the unit being adapted for connection to a light socket and comprising;

means for providing a varying output signal during a brightness selection cycle which is initiated by supplying power to the dimmer unit; and means for storing a value representing a selected brightness at termination of the brightness selection cycle, the brightness selection cycle being terminated by ceasing the supply of power to the dimmer unit.

2. The dimmer unit as claimed in claim 1, wherein power is applied to the lamp corresponding to the selected brightness when power is next supplied to the dimmer unit after termination of the brightness selection cycle.

3. The dimmer unit as claimed in claim 2, wherein the power applied corresponding to the selected brightness is ramped.

4. The dimmer unit as claimed in claim 1, wherein the means for storing a value comprises a non-volatile memory.

5. The dimmer unit as claimed in claim 1, wherein the means for ramping power comprises a controller for controlling a triac which governs the power supply to the lamp.

6. The dimmer unit as claimed in claim 1, further comprising means for determining whether the time during which power is applied to the unit is below a threshold time period and for switching the unit to a security mode if power is applied for less than the threshold time period after setting a brightness level.

7. The dimmer unit as claimed in claim 6, further comprising a light detector for controlling the supply of power to the lamp during the security mode.

8. The dimmer unit as claimed in claim 1, further comprising a sensor enabling the brightness selection cycle to be started and terminated remotely without interrupting the power supply to the dimmer unit.

9. A light bulb comprising a lamp and the dimmer unit as claimed in claim 1.

10. A method of selecting a dimmer unit setting corresponding to a brightness of a lamp associated with the dimmer unit, the dimmer unit being adapted for connection to a light socket, the method comprising:

(i) supplying power to the unit by switching on power to the light socket, the dimmer unit ramping the power supplied to the lamp;

(ii) switching off power to the light socket to select the brightness reached, the dimmer unit storing a value representing the selected brightness; and (iii) switching on power to the light socket, the dimmer unit t applying power to the lamp corresponding to the selected brightness.

11. The method as claimed in claim 10, wherein a security setting may be obtained by switching off power to the light socket within a predetermined time period after switching on power in step (iii), and further switching on power to the light socket.

* * * * *